US008369874B2

(12) United States Patent
Lee

(10) Patent No.: US 8,369,874 B2
(45) Date of Patent: Feb. 5, 2013

(54) METHOD AND SYSTEM FOR PROVIDING A MOBILE TERMINAL SEARCH SERVICE

(76) Inventor: Seung Won Lee, Fort Lee, NJ (US)

( * ) Notice: Subject to any disclaimer, the term of this patent is extended or adjusted under 35 U.S.C. 154(b) by 454 days.

(21) Appl. No.: 12/400,896

(22) Filed: Mar. 10, 2009

(65) Prior Publication Data

US 2009/0233624 A1 Sep. 17, 2009

(30) Foreign Application Priority Data

Mar. 14, 2008 (KR) .................. 10-2008-0024076
Mar. 14, 2008 (KR) .................. 10-2008-0024077
Mar. 14, 2008 (KR) .................. 10-2008-0024078

(51) Int. Cl.
*H04W 24/00* (2009.01)

(52) U.S. Cl. .............. 455/456.3; 455/456.1; 455/457; 455/456.2

(58) Field of Classification Search ....... 455/456.1–457, 455/404.2; 340/539.13
See application file for complete search history.

(56) References Cited

U.S. PATENT DOCUMENTS

| | | | | |
|---|---|---|---|---|
| 5,216,227 | A | * | 6/1993 | Ohta .............................. 235/375 |
| 6,910,221 | B1 | * | 6/2005 | Honda ............................. 725/93 |
| 7,176,956 | B2 | | 2/2007 | Rzeszewski | |
| 7,203,674 | B2 | | 4/2007 | Cohen | |
| 2003/0087652 | A1 | * | 5/2003 | Simon et al. ................... 455/466 |
| 2005/0227703 | A1 | * | 10/2005 | Cheng ......................... 455/456.1 |
| 2005/0282530 | A1 | * | 12/2005 | Raff .............................. 455/418 |
| 2006/0265277 | A1 | * | 11/2006 | Yasinovsky et al. ............ 705/11 |
| 2007/0218900 | A1 | * | 9/2007 | Abhyanker ................ 455/435.1 |
| 2007/0255831 | A1 | | 11/2007 | Hayashi | |
| 2007/0282621 | A1 | | 12/2007 | Altman | |
| 2009/0061905 | A1 | * | 3/2009 | Malik ......................... 455/456.6 |

FOREIGN PATENT DOCUMENTS

| | | |
|---|---|---|
| KR | 1020040073803 A | 8/2004 |
| KR | 1020030021217 A | 6/2005 |

OTHER PUBLICATIONS

Printout of XPS Overview, retrieved from http://www.skyhookwireless.com/howitworks/ (2009).
Summons and Verified Complaint.

* cited by examiner

*Primary Examiner* — Wayne Cai
*Assistant Examiner* — Ronald Eisner
(74) *Attorney, Agent, or Firm* — Lucas & Mercanti LLP; Robert P. Michal

(57) ABSTRACT

A method and system for providing a mobile terminal search service includes the steps of (a) requesting, by a first mobile terminal, to search for a second mobile terminal, the first mobile terminal having avatar information stored thereon, and (b) searching for the second mobile terminal within a geographical range corresponding to the avatar information of the first mobile terminal.

29 Claims, 12 Drawing Sheets

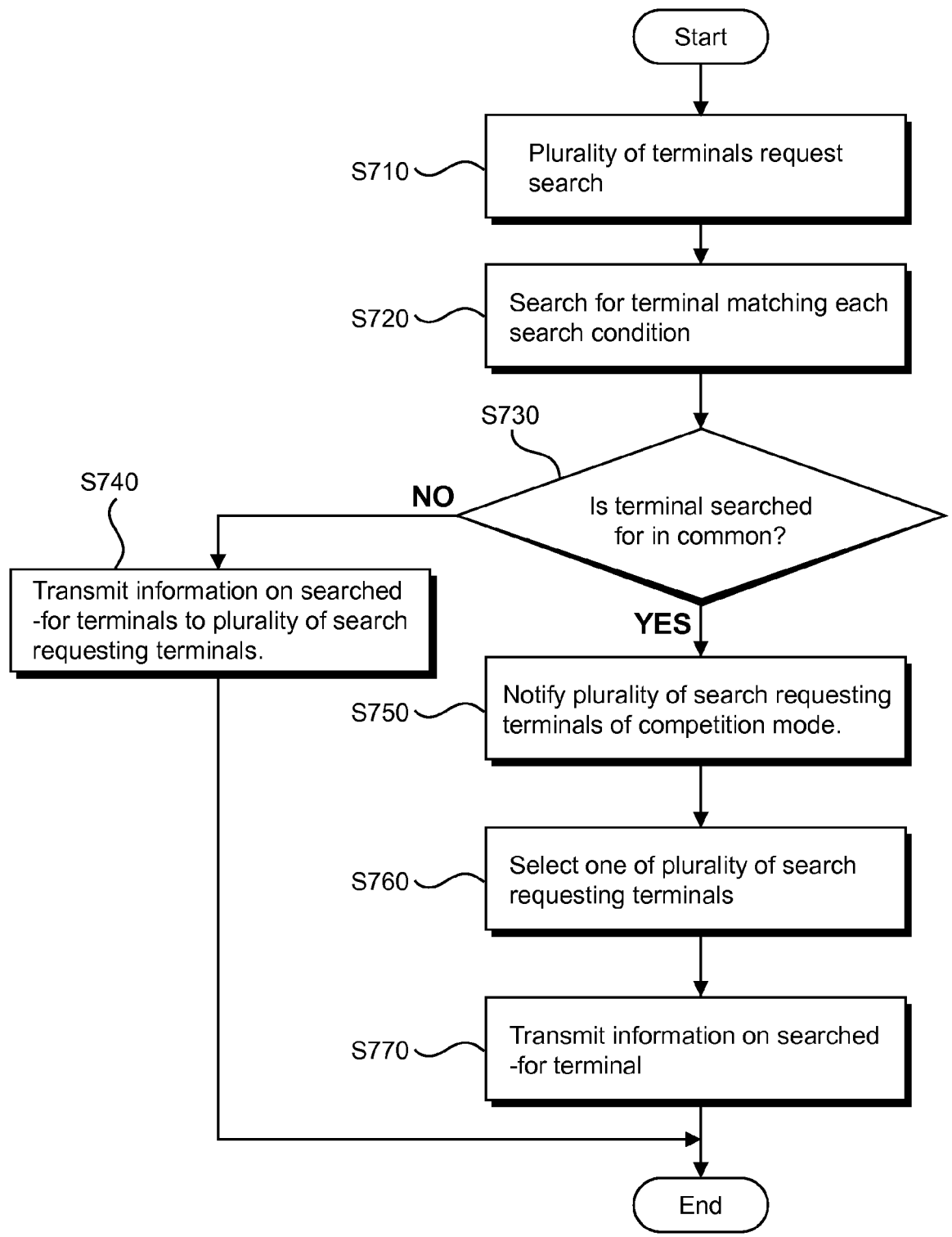

US 8,369,874 B2

METHOD AND SYSTEM FOR PROVIDING A MOBILE TERMINAL SEARCH SERVICE

CROSS-REFERENCE TO RELATED APPLICATIONS

This application claims the benefit of priority from Korean Patent Application Nos. 10-2008-0024076, filed on Mar. 14, 2008, 10-2008-0024077, filed on Mar. 14, 2008, and 10-2008-0024078, filed on Mar. 14, 2008, the contents of each of which are incorporated herein by reference.

BACKGROUND OF THE INVENTION

1. Field of the Invention

The present invention relates to a method and system for providing a mobile terminal search service, and more particularly, to a method and system for providing a mobile terminal search service that provide avatar or location information of mobile terminals.

2. Discussion of Related Art

Recent developments in mobile communication systems have enabled individuals to communicate via voice or video and to generate and utilize voice or image data using their mobile terminals. In addition, Location-Based Service (LBS) is used to locate mobile terminals.

Meanwhile, personal matching/dating services have recently been provided with the goal of enabling users to discover their ideal match using a mobile terminal, and such services have utilized avatars.

However, such conventional mobile terminal search services or matching services merely provide an alarm when service users come within a predetermined proximity of one another. Accordingly, service users are less likely to connect with one another and quality of service is low.

SUMMARY OF THE INVENTION

The present invention is directed to a method for providing a mobile terminal search service that is capable of providing improved service for high user satisfaction.

A first aspect of the present invention provides a method for providing a mobile terminal search service, including the steps of: (a) requesting, by a first mobile terminal, to search for a second mobile terminal, the first mobile terminal having avatar information stored thereon; and (b) searching for the second mobile terminal within a geographical range corresponding to the avatar information of the first mobile terminal.

A second aspect of the present invention provides a mobile terminal search service system comprising: a first mobile terminal having avatar information stored thereon; and a search server for searching for a second mobile terminal within a geographical range corresponding to the avatar information of the first mobile terminal when the first mobile terminal requests to search for the second mobile terminal.

Another aspect of the present invention provides a method for providing a mobile terminal search service, including the steps of: (a) transmitting avatar information and ideal type information of a first mobile terminal to request to search for a second mobile terminal matching the ideal type information; and (b) searching for the second mobile terminal having user profile information matching the ideal type information among mobile terminals located within a geographical range corresponding to the avatar information of the first mobile terminal.

Yet another aspect of the present invention provides a mobile terminal search service system including: a first mobile terminal for transmitting avatar information and ideal type information and making a request for mobile terminal search; a location register storing location information; and a search server for receiving information on a mobile terminal located within a geographical range corresponding to the avatar information from the location register, and determining whether user profile information of the mobile terminal matches the ideal type information A further aspect of the present invention provides a method for providing a mobile terminal search service, including the steps of: (a) transmitting, by a plurality of search requesting mobile terminals, search conditions to request a mobile terminal search; (b) searching for a mobile terminal according to the respective search conditions, and notifying the plurality of search requesting mobile terminals of a first competition mode when a mobile terminal matching the respective search conditions is searched for in common; and (c) transmitting information on the searched-for mobile terminal to one of the plurality of search requesting mobile terminals selected in the first competition mode.

Other aspects of the present invention can be clearly understood by those skilled in the art from the following description.

BRIEF DESCRIPTION OF THE DRAWINGS

The above and other objects, features and advantages of the present invention will become more apparent to those of ordinary skill in the art by describing in detail preferred exemplary embodiments thereof with reference to the attached drawings, in which:

FIG. 7 is a flowchart illustrating a method for providing a mobile terminal search service according to an exemplary embodiment of the present invention;

DETAILED DESCRIPTION OF EXEMPLARY EMBODIMENTS

Figure 1:
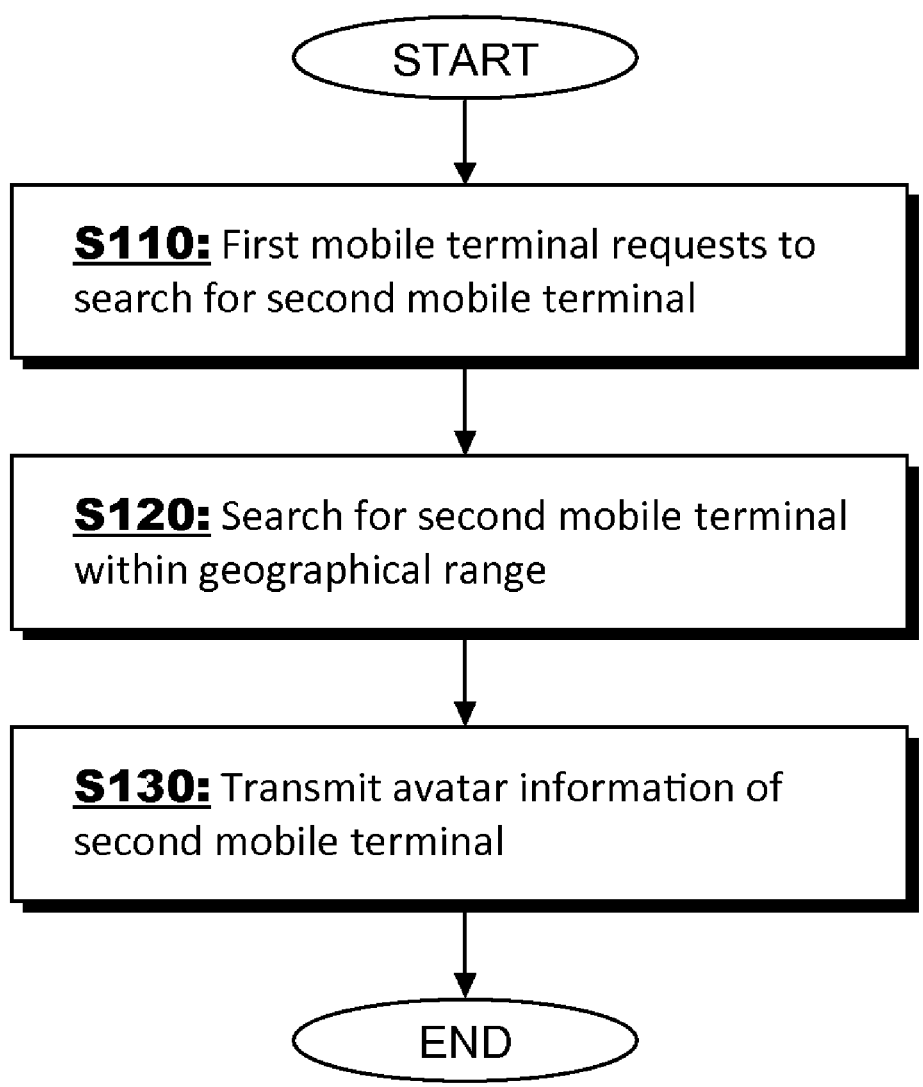
FIG. 1 is a flowchart illustrating a method for providing a mobile terminal search service according to an exemplary embodiment of the present invention.

The present invention provides a method for providing a mobile terminal search service, comprising the steps of:

(a) requesting, by a first mobile terminal, to search for a second mobile terminal, the first mobile terminal having avatar information stored thereon; and (b) searching for the second mobile terminal within a geographical range corresponding to the avatar information of the first mobile terminal.

In a further aspect of the invention, the method includes the step of:

(c) transmitting avatar information of the second searched-for mobile terminal to the first mobile terminal.

In a still further aspect of the invention, the method includes the step of:

(d) transmitting an indication as to whether the search requested by the first mobile terminal is successful and the avatar information of the first mobile terminal to the second mobile terminal.

In one aspect, step (a) includes transmitting, by the first mobile terminal, ideal type information and requesting to search for the second mobile terminal matching the ideal type information.

In another aspect, the number of ideal type information is determined depending on the avatar information.

In yet another aspect, the avatar information of the first mobile terminal is adjusted through at least one of a game performed on the first mobile terminal and an item purchased online or offline.

In a still further aspect of the invention, the method includes the steps of:

(c) requesting, by a third mobile terminal, to search for the second mobile terminal, the third mobile terminal having avatar information stored thereon;

(d) searching for the second mobile terminal within a geographical range corresponding to the avatar information of the third mobile terminal; and (e) when the second mobile terminal is searched for in common in steps (c) and (d), notifying the first and third mobile terminals of a competition mode.

In a still further aspect of the invention, the method includes the step of:

(f) transmitting avatar information of the second mobile terminal to a selected one of the first and third mobile terminals.

In yet another aspect, step (a) includes displaying an image in which a figure of the avatar of the first mobile terminal disappears, on a display panel of the first mobile terminal, after requesting to search for the second mobile terminal.

In yet another aspect, the step of searching for the second mobile terminal further includes the step of obtaining the location information of the second mobile terminal using Global Positioning System coordinates.

In yet another aspect, the step of searching for the second mobile terminal further includes the step of obtaining the location information of the second mobile terminal by measuring the strength or weakness of signals from at least three cell towers.

In yet another aspect, the step of searching for the second mobile terminal further includes the step of obtaining the location information of the second mobile terminal through a wireless internet hotspot.

In yet another aspect of the present invention, there is provided a mobile terminal search service system including:

a search server for searching for a second mobile terminal within a geographical range corresponding to avatar information of a first mobile terminal when the first mobile terminal requests to search for the second mobile terminal.

In yet another aspect of the present invention, there is provided a mobile terminal search service system including:

a first mobile terminal having avatar information stored thereon; and a search server for searching for a second mobile terminal within a geographical range corresponding to the avatar information of the first mobile terminal when the first mobile terminal requests to search for the second mobile terminal.

In one aspect of the system, the search server transmits avatar information of the second mobile terminal to the first mobile terminal.

In another aspect, the system includes a database having user profile information stored thereon, wherein:

when the first mobile terminal transmits ideal type information, the search server reads the user profile information from the database and searches for the second mobile terminal having user profile information matching the ideal type information.

In yet another aspect, the avatar information and the user profile information are updated and stored in the database upon at least one of a call request, communication, a message transmission request, a request to search for the second mobile terminal, and a data update request.

In yet another aspect, the avatar information of the first mobile terminal is adjusted through at least one of a game performed on the first mobile terminal and an item purchased online or offline.

In yet another aspect of the present invention, there is provided a mobile terminal search service system including:

a first mobile terminal including a web agent and having avatar information stored thereon; and a second mobile terminal, wherein the web agent accesses the second mobile terminal within a geographical range corresponding to the avatar information and performs retrieval on the second mobile terminal.

In yet another aspect of the present invention, there is provided a method for providing a mobile terminal search service, including the steps of:

(a) transmitting avatar information and ideal type information of a first mobile terminal to request to search for a second mobile terminal matching the ideal type information; and (b) searching for the second mobile terminal having user profile information matching the ideal type information among mobile terminals located within a geographical range corresponding to the avatar information of the first mobile terminal.

In a further aspect of the method, the method includes the step of:

(c) reading avatar information of the second mobile terminal from a database and transmitting the avatar information to the first mobile terminal.

In one aspect, the avatar information and the user profile information are updated and stored in the database upon at least one of a call request, communication, a message transmission request, a data update request, and step (a).

In a still further aspect, the method includes the step of:

(d) transmitting an indication as to whether the second mobile terminal has been searched for and the avatar information of the first mobile terminal to the second mobile terminal.

In a still further aspect, the method includes the step of:

transmitting location information of the second searched-for mobile terminal to the first mobile terminal.

In another aspect of the method, the number of items constituting the ideal type information is determined depending on the avatar information of the first mobile terminal.

In yet another aspect of the method, the avatar information of the first mobile terminal is adjusted through at least one of a game performed on the first mobile terminal and an item purchased online or offline.

In yet another aspect, step (b) includes the steps of:

(b1) first searching for a mobile terminal located within the geographical range corresponding to the avatar information; and (b2) reading user profile information of a user of the first searched-for mobile terminal from a database and further searching for the second mobile terminal matching the ideal type information.

In yet another aspect of the method, when a user of the first mobile terminal selects some regions or buildings within the geographical range corresponding to the avatar information, step (a) comprises transmitting information on the selected regions or buildings, and step (b) comprises searching for the second mobile terminal located within the selected regions or buildings.

In yet another aspect, wherein step (a) includes displaying an image of an avatar figure of the first mobile terminal disappearing on a display panel of the first mobile terminal, after requesting to search for the second mobile terminal.

In yet another aspect of the present invention, there is provided a mobile terminal search service system including:

a location register storing location information of a first mobile terminal transmitting avatar information and ideal type information and making a request for mobile terminal search; and a search server for receiving information on a mobile terminal located within a geographical range corresponding to the avatar information from the location register, and determining whether user profile information of another mobile terminal matches the ideal type information.

In yet another aspect of the present invention, there is provided a mobile terminal search service system including:

a first mobile terminal for transmitting avatar information and ideal type information and making a request for mobile terminal search;

a location register storing location information; and a search server for receiving information on a mobile terminal located within a geographical range corresponding to the avatar information from the location register, and determining whether user profile information of another mobile terminal matches the ideal type information.

In one aspect of the system, the search server transmits avatar information of the second mobile terminal having the user profile information matching the ideal type information to the first mobile terminal.

In a further aspect of the system, the system includes a database for storing the avatar information and the user profile information of the first mobile terminal and of the second mobile terminal.

In another aspect of the system, each mobile terminal transmits the avatar information and the user profile information upon at least one of a call request, communication, a message transmission request, and a mobile terminal search request, and the search server updates and stores the transmitted avatar information and user profile information in the database.

In yet another aspect, the search server further transmits location information of the second mobile terminal to the first mobile terminal.

In yet another aspect, the number of items constituting the ideal type information is determined depending on the avatar information.

In yet another aspect, the avatar information of the first mobile terminal is adjusted through at least one of a game performed on the first mobile terminal and an item purchased online or offline.

In yet another aspect, when a user of the first mobile terminal selects some regions or buildings within the geographical range corresponding to the avatar information, the first mobile terminal further transmits information on the selected regions or buildings, and the search server searches for the second mobile terminal located within the selected regions or buildings.

In yet another aspect of the present invention, there is provided a method for providing a mobile terminal search service, including the steps of:

(a) transmitting, by a plurality of search requesting mobile terminals, search conditions to request a mobile terminal search;

(b) searching for a mobile terminal according to the respective search conditions, and notifying the plurality of search requesting mobile terminals of a first competition mode when a mobile terminal matching the respective search conditions is searched for in common; and (c) transmitting information on the searched-for mobile terminal to one of the plurality of search requesting mobile terminals selected in the first competition mode.

In one aspect of the method, the plurality of search requesting mobile terminals and the searched-for mobile terminal have respective avatar information, the plurality of search requesting mobile terminals further transmit the respective avatar information in step (a), and step (c) comprises transmitting avatar information of the searched-for mobile terminal to the selected search requesting mobile terminal.

In another aspect, step (b) comprises transmitting avatar information of the other search requesting mobile terminals to the respective search requesting mobile terminals.

In yet another aspect, one of the plurality of search requesting mobile terminals is selected based on avatar information of the respective search requesting mobile terminals in the first competition mode.

In yet another aspect, a geographical search range is determined depending on the respective avatar information.

In yet another aspect, each search condition comprises the number of ideal type criteria of users of the search requesting mobile terminals, and the number of ideal type criteria of a user of a first mobile terminal is determined depending on the avatar information.

In yet another aspect, the avatar information is adjusted through at least one of a game performed on each search requesting mobile terminal and an item purchased online or offline.

In yet another aspect, the avatar information is updated and stored in the database upon at least one of a call request, communication, a message transmission request, a mobile terminal search request, and a data update request.

In yet another aspect, step (a) includes displaying an image of a figure of the avatar of each search requesting mobile terminal disappearing on a display panel of the search requesting mobile terminal, after making a request for mobile terminal search.

In a further aspect, the method includes, prior to step (c), the step of, (d) determining, by each search requesting mobile terminal, whether to participate in the first competition mode and transmitting the determination result, wherein step (c) comprises selecting one of the search requesting mobile terminals participating in the first competition mode.

In a still further aspect, the method includes the step of:

transmitting an indication as to whether the search requested by the plurality of search requesting mobile terminals is successful, and information on the plurality of search requesting mobile terminals, to the searched-for mobile terminal.

In a still further aspect, the method includes the step of:

when two or more mobile terminals are searched for in step (b), notifying the two or more searched-for mobile terminals of a second competition mode.

In another aspect of the method, step (c) includes transmitting information on one searched-for mobile terminal selected in the second competition mode to the search requesting mobile terminal selected in the first competition mode.

In yet another aspect, the avatar information is adjusted through at least one of a game performed on each search requesting mobile terminal and an item purchased online or offline.

In yet another aspect, the avatar information is adjusted through at least one of a game performed on each search requesting mobile terminal and an item purchased online or offline.

The present invention will now be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be sufficiently thorough and complete to fully enable those skilled in the art to embody and practice the invention. Like numbers refer to like elements throughout the specification. The term "and/or" is used to indicate any combination of a plurality of items as well as each individual item by itself.

Hereinafter, a method and system for providing a mobile terminal search service according to an exemplary embodiment of the present invention will be described with reference to FIGS. 1 to 2e.

Figure 2A:
FIGS. 2a, 2b, 2d and 2e are views for explaining avatars of mobile terminals.
Figure 2B:
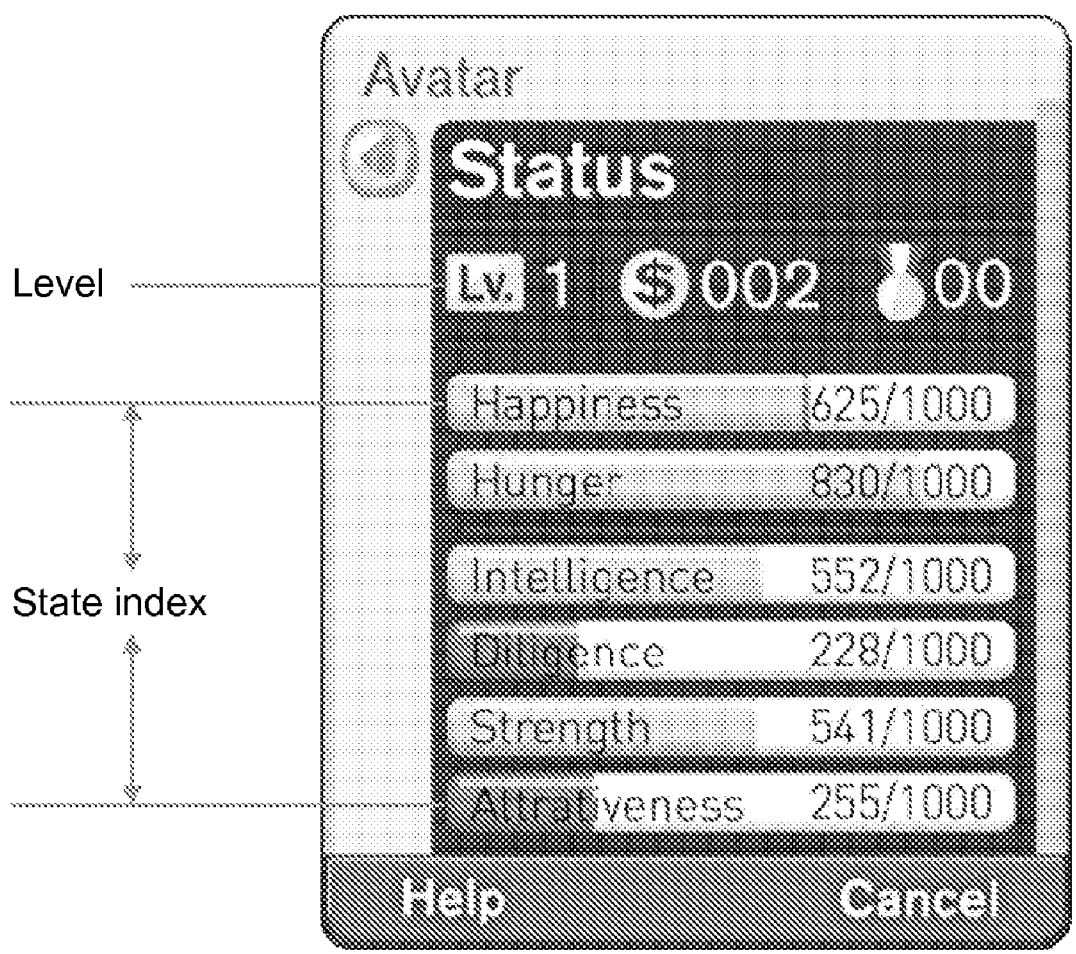
Figure 2C:
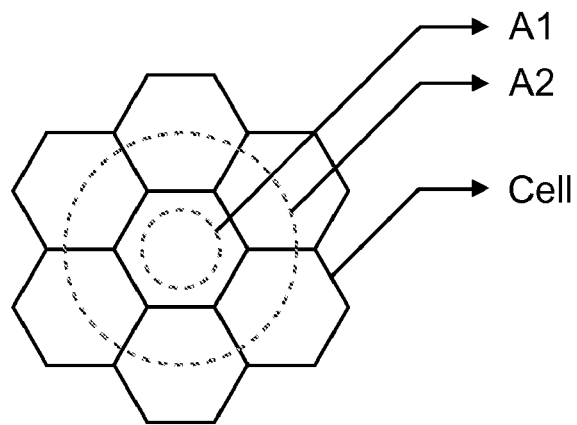
FIG. 2c illustrates an example in which a geographical range is determined depending on avatar information.

FIG. 1 is a flowchart illustrating a method for providing a mobile terminal search service according to an exemplary embodiment of the present invention, FIGS. 2a, 2b, 2d and 2e are views for explaining avatars of mobile terminals, and FIG. 2c illustrates an example in which a geographical range is determined depending on avatar information.

Referring first to FIG. 1, a first mobile terminal requests to search for a second mobile terminal (Sil0). Here, the first mobile terminal may have an avatar created or set by a user, as shown in FIG. 2a. After the first mobile terminal requests to search for the second mobile terminal (S110), an image of the figure of the avatar for the first mobile terminal gradually disappearing may be displayed on a display panel of the first mobile terminal. The second mobile terminal is then searched for within a geographical range corresponding to the avatar information of the first mobile terminal (S120). Avatar information of the second mobile terminal may then be transmitted to the first mobile terminal (S130).

For example, in operation, the mobile terminal requesting the search may access a web server to download a figure of the avatar and an avatar growing program. The user may use the avatar growing program to grow the avatar. The avatar has avatar information which may include, for example, a figure, a unique name, a level, and a state index. The user may grow the avatar by adjusting the figure, the unique name, the level, and the state index using the mobile terminal. The user of the mobile terminal may grow the avatar to resemble himself/herself or however he/she desires. The state index may indicate the avatar's emotions, hunger, intelligence, strength, attractiveness, and the like, as shown in FIG. 2b, and the level of the avatar may be adjusted depending on the state index. Alternatively, the avatar level may be adjusted by a game program or an item purchased online or offline. As the avatar grows, the avatar level may increase. In some examples the avatar includes six status meters, each status meter may contain a variety of mini-games. Such mini-games applicable to each status meter can be purchased online. In addition, users can increase the value of each status meter by playing mini-games applicable to the status meter.

Referring briefly to FIG. 2c, when the level in the avatar information of the first mobile terminal is "1", the second mobile terminal is searched for within a first range A1 When the level is "2", the second mobile terminal may be searched for within a second range A2 that is greater than the first range A1.

Figure 2D:
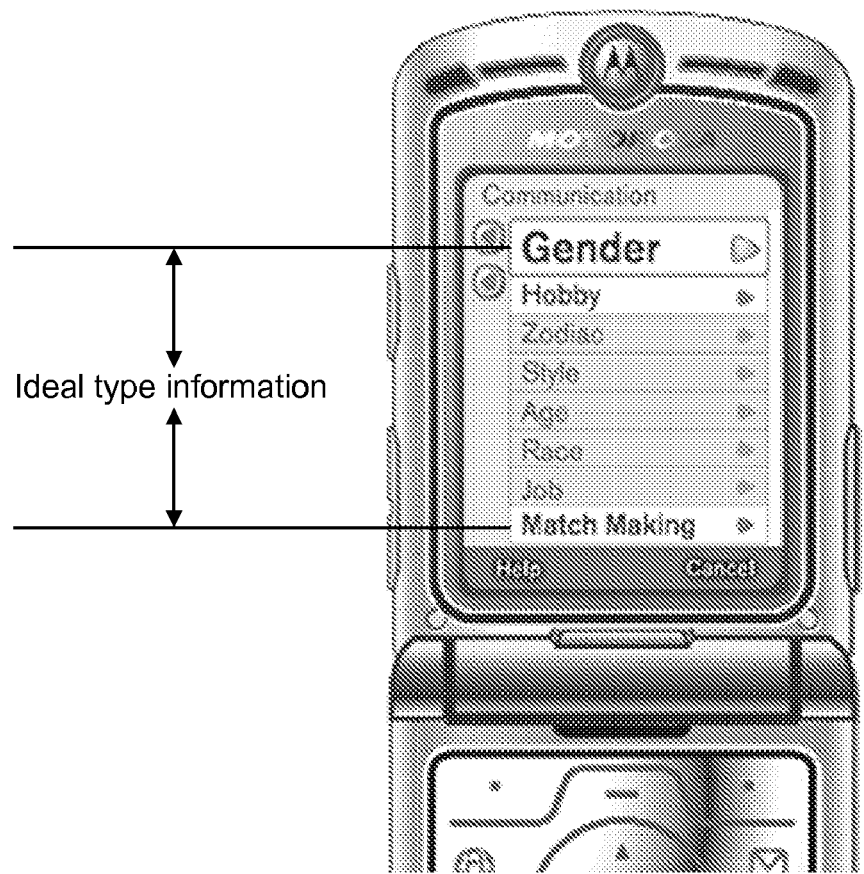

Meanwhile, the first mobile terminal may transmit ideal type information and request to search for a second mobile terminal that matches the ideal type information. Here, the ideal type information may include sex, hobby, style, age, and job, as shown in FIG. 2d. In this case, the amount of ideal type information may be determined depending on the avatar level. For example, when the avatar level is "1", three pieces of ideal type information—sex, hobby, and age—may be set, and when the avatar level is "2", five pieces of ideal type information—sex, hobby, age, style, and job—may be set.

Meanwhile, the users of the first and second mobile terminals may set and store user profile information and ideal type information in their mobile terminals. Here, the user profile information includes sex, age, height, style, job, etc. and is used when searching for a mobile terminal matching the ideal type information.

In a further example, when all of the status meters of the avatar are above 50% (e.g. $^{500}/_{1000}$), options for a person whom the user desires to meet become activated one by one. For example, at the start of the game, the level of the avatar may be initially set as 1, and the only available option is to select gender. When all of the status meters are above 50%, a second option, as for example "Hobby" becomes available. When all of the status meters become full, the level of the avatar becomes 2 and a third option, as for "Zodiac" becomes available and all of the status meters get reset as 0%.

Figure 2E:
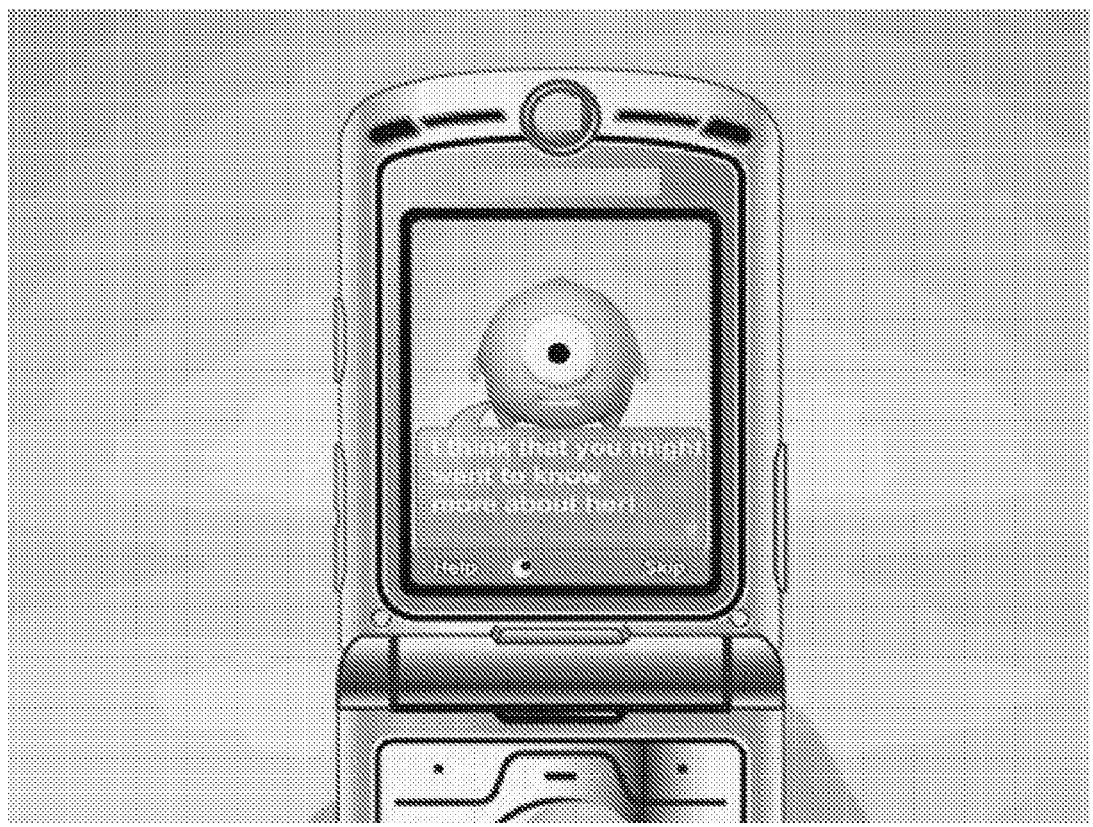

When avatar information of the second mobile terminal is transmitted to the first mobile terminal (S130), an avatar figure, avatar level, state index, and the like of the second mobile terminal may be displayed on the first mobile terminal, as shown in FIG. 2e. Furthermore, an indication as to whether the search requested by the first mobile terminal is successful, and the avatar information of the first mobile terminal, may be transmitted to the second mobile terminal. Specifically, an image of the avatar of the first mobile terminal escorting the avatar of the second mobile terminal onto the display screen may be displayed.

Figure 3:
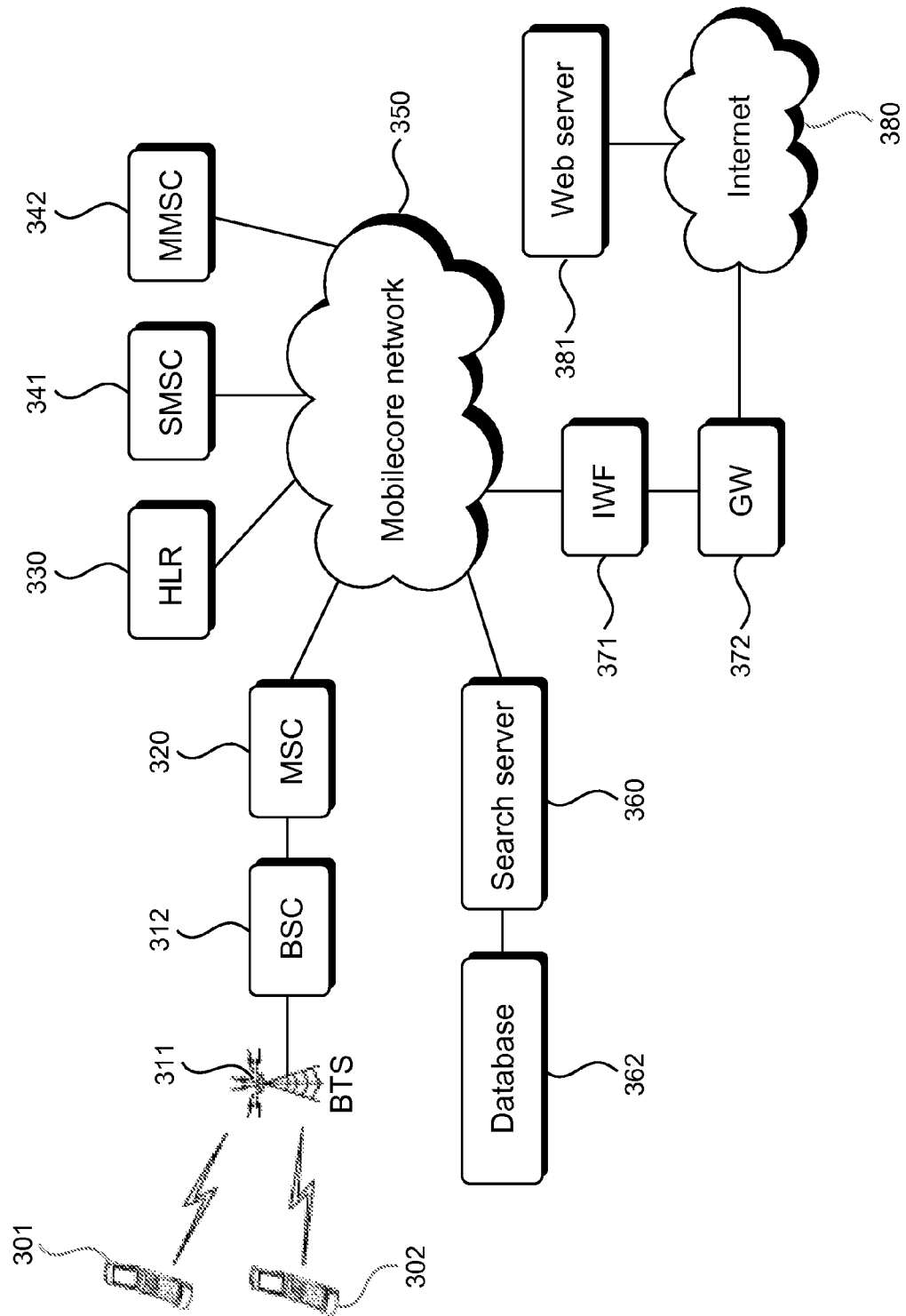
FIG. 3 is a block diagram of a system for providing a mobile terminal search service according to an exemplary embodiment of the present invention.

The system for providing a mobile terminal search service will now be described with reference to FIG. 3. FIG. 3 is a block diagram illustrating an example of a system for providing a mobile terminal search service according to an exemplary embodiment of the present invention. However, a method for providing a mobile terminal search service according to the present invention may be carried out by a variety of systems, including the system shown in FIG. 3.

Referring to FIG. 3, the a mobile terminal search service system according to an exemplary embodiment of the present invention includes a first mobile terminal 301, a second mobile terminal 302, a base station transceiver subsystem (BTS) 311, a base station controller (BSC) 312, a mobile switching center (MSC) 320, a home location register (HLR) 330, a short message service center (SMSC) 341, a multimedia message service center (MMSC) 342, a search server 360, a database 362, a mobile core network 350, an inter-working function (IWF) 371, a WAP gateway 372, the Internet 380, and a web server 381. The IWF 371 is in communication with the wireless application protocol (WAP) gateway (GW) 372 which is in communication with the Internet 380.

The mobile network 350 consists of a mobile core network and a radio access network. The mobile core network 350 includes a signaling system 7 (SS7) network, a private network, or an IP-based core network, and provides service to a user that has accessed the radio access network (RAN).

The first and second mobile terminals 301 and 302 may perform voice and data communication with other mobile terminals connected to the mobile network, and may access the Internet via the IWF 371 and GW 372, which interwork with the mobile network. The first and second mobile terminals 301 and 302 may include a wireless Internet platform for driving applications related to the wireless Internet or a browser for accessing the wireless Internet. For example, the wireless Internet platform may include a Wireless Internet Platform for Interoperability (WIPI), BREW (Binary Runtime Environment for Wireless) or Android (a new mobile platform). The browser for accessing wireless Internet may include an HTML-based Microsoft Internet Explorer (MIE) using HTTP protocol, and a Handheld Device Transport Protocol (HDTP), as well as a Wireless Application Protocol (WAP)-based WAP browser.

The first mobile terminal 301 may have avatar information and/or ideal type information, as described above. The number of pieces of ideal type information may be determined depending on the avatar information. Here, the first and second mobile terminals 301 and 302 according, to an exemplary embodiment of the present invention may be any of various wireless communication mobile terminals, such as Personal Digital Assistants (PDAs), cellular phones, Personal Communication Service (PCS) phones, hand-held personal computers (PCs), Global System for Mobile (GSM) phones, Wideband CDMA (WCDMA) phones, Code Division Multiple Access (CDMA) 2000 phones, Mobile Broadband System (MBS) phones, etc.

The BTS 311 is wirelessly connected with the first and second mobile terminals 301 and 302 within a wireless coverage area, manages the first and second mobile terminals 301 and 302, establishes a communication channel, and performs voice and data communication. The BTS 311 is arranged on a cell-by-cell basis for each wireless coverage area, and receives location information from the first and second mobile terminals 301 and 302 within a cell managed by the BTS 311. Location information including location, state, and identifier information of the first and second mobile terminals 301 and 302, is transmitted to the MSC 320 via the BTS 311 and the BSC 312 and registered in the MSC 320. In the present exemplary embodiment, the BTS 311 transmits the avatar information and/or ideal type information of the first mobile terminal 301 to the BSC 312. In the example of FIG. 3, the first and second mobile terminals 301 and 302 are located in the same cell. When the first and second mobile terminals 301 and 302 are located in different cells, different BTSs may manage the first and second mobile terminals 301 and 302.

The BSC 312 connects the BTS 311 to the MSC 320 while managing the BTS 311, and performs signal processing for communication between the BTS 311 and the MSC 320, channel allocation and release for the mobile terminals 301 and 302, a determination as to whether hand-off between BTS cells is performed, BTS operation and maintenance, and the like. In the present exemplary embodiment the BSC 312 transmits the avatar information and/or the ideal type information to the MSC 320.

The MSC 320 exchanges a telephone connection between the first and second mobile terminals 301 and 302. The MSC 320 also performs communication establishment and release for the first and second mobile terminals 301 and 302, location registration and hand-off processing, and interworking with other networks. The MSC 320 includes a visitor location register (VLR, not shown) and interworks with the HLR 330, the SMSC 341, and the MMSC 342 to process calls from the mobile terminals 301 and 302. The MSC 320 receives location information of the first and second mobile terminals 301 and 302 via the BTS 311, temporarily stores the location information in the VLR of the MSC 320, requests the HLR 330 to register the location information, acquires, from the HLR 330, information on subscribers of the first and second mobile terminals 301 and 302 located within its coverage area, and stores the information temporarily. In the present exemplary embodiment, the MSC 320 may transmit avatar information of the first mobile terminal 301 to the HLR 330 and request to search for a mobile terminal located within a geographical range corresponding to avatar information. The MSC 320 may also transmit the avatar information and/or ideal type information of the first mobile terminal 301 to the search server 360.

The HLR 330 interworks with the MSC 320, the SMSC 341, and the MMSC 342, stores information relating to mobile subscribers, such as subscriber information, location information, and the like of the first and second mobile terminals 301 and 302, and performs call processing and various processing related to additional services in communication with the VLR. Here, the subscriber information includes a Mobile Identification Number (MIN), an Electronic Serial Number (ESN), information on mobile service subscribed to by the subscribers, and the like. In the present exemplary embodiment, the HLR 330 transmits information on a mobile terminal located in the geographical range corresponding to the avatar information of the first mobile terminal 301, such as the MIN, to the search server 360.

The SMSC 341 and the MMSC 342 are connected to the MSC 320 and the HLR 330 for storing, transmitting and receiving a short message and a multimedia message. When the first mobile terminal 301 transmits a short message or a multimedia message, the SMSC 341 or the MMSC 342 receives the message via the MSC 320 and transmits the received message to the second mobile terminal 302 as a called party.

The web server 381 is included in a mobile service provider. The subscriber may download a figure of an avatar, a game program, and the like from the web server 381 via the Internet 380 and purchase an item necessary for avatar growth.

The search server 360 interworks with the database 362. The search server 360 searches for the second mobile terminal 302 in response to the search request from the first mobile terminal 301. The avatar information, the user profile information, and the like of the first and second mobile terminals 301 and 302 are stored in the database 362.

Specifically, the search server 360 may read the user profile information of the mobile terminal user from the database 362 using the MIN of the mobile terminal received from the HLR 330. The search server 360 compares the read user profile information with the ideal type information received from the first mobile terminal 301 to further search for the second mobile terminal. The search server 360 reads the avatar information of the second mobile terminal 302 from the database 362 and transmits the same to the first mobile terminal 301. In this case, the avatar figure, avatar level, state index, and the like of the second mobile terminal 302 may be displayed on the first mobile terminal 301.

In this case, the search server 360 may also transmit an indication that the second mobile terminal 302 has been searched for in response to the search request from the first mobile terminal 301, and the avatar information of the first mobile terminal 301 to the second mobile terminal 302. In this case, the avatar figure, avatar level, state index, and the like of the first mobile terminal 301 may be displayed on the second mobile terminal 302.

When the search server 360 transmits the MIN of the second mobile terminal 302 to the HLR 330, the HLR 330 may transmit the location information of the second mobile terminal 302 to the first mobile terminal 301.

Meanwhile, since the avatar information, the user profile information, and the ideal type information are variable, they may be updated and stored in the database 362 upon at least one of a call request, communication, a message transmission request, a data update request, and a search service request. Here, the data update request refers to a separate request made by the mobile terminal user to update user profile information, ideal type information, avatar information, and the like. For this, the mobile terminals 301 and 302 may have a separate key for data update request.

By contrast, when the first mobile terminal 301 makes a request for mobile terminal search, the search server 360 receives the avatar information and/or ideal type information of the first mobile terminal 301, determines a geographical range corresponding to the avatar information, and requests the HLR 330 to provide information on a mobile terminal located in the determined geographical range. When the HLR 330 searches for the mobile terminal in the determined geographical range and transmits the information on the searched-for mobile terminal, such as a MIN, to the search server 360, the search server 360 may read the user profile information from the database 362 using the mobile terminal information received from the HLR 330 and determine whether it matches the ideal type information. When the user profile information matches the ideal type information, the search server 360 may read the avatar information of the second mobile terminal 302 having the user profile information from the database and transmit the avatar information to the first mobile terminal 301.

Meanwhile, in the method for providing a mobile terminal search service according to the present invention, the search server 360 may obtain and use the location information of the mobile terminal using a Global Positioning System (GPS) to focus a search within a geographic area. That is, when each mobile terminal includes a GPS module and transmits coordinate information, the search server 360 may recognize location information of each mobile terminal based on the coordinate information.

For indoor usage, such as use inside a building, it may not be possible to obtain location information when only GPS is used. In such cases a user location may be obtained by measuring the strength or weakness of signals from three cell towers. Alternatively a user location may be obtained by using a wireless internet hotspot. Such techniques are known to those skilled in the art. For example, i-phone® cell phones from Apple, Inc. use all of the three aforementioned methods in location based service (LBS). One example LBS system is described at Internet URL http://www.skyhookwireless.com/howitworks/ which description is incorporated here by reference.

Alternatively, the avatar of the first mobile terminal 301 may access another mobile terminal to search for the second mobile terminal 302 matching the ideal type information. Specifically, the first mobile terminal 301 may include a web agent and access the second mobile terminal 302 through the mobile network, retrieve the avatar information, user profile information, and the like of the second mobile terminal 302, and transmit the search results to the first mobile terminal 301. Here, the web agent may be classified as an information retrieval agent, an information filtering agent, an information integration agent, an information extraction agent, and the like. According to an exemplary embodiment of the present invention, the web agent may be a combination of any or all of such agents. The information retrieval agent serves to retrieve information and provide it to the user of the first mobile terminal 301 who wants it. The information filtering agent serves to filter and process information as intended by the first mobile terminal 301. The information integration agent may retrieve, integrate and display several mobile terminals' information.

Figure 4:
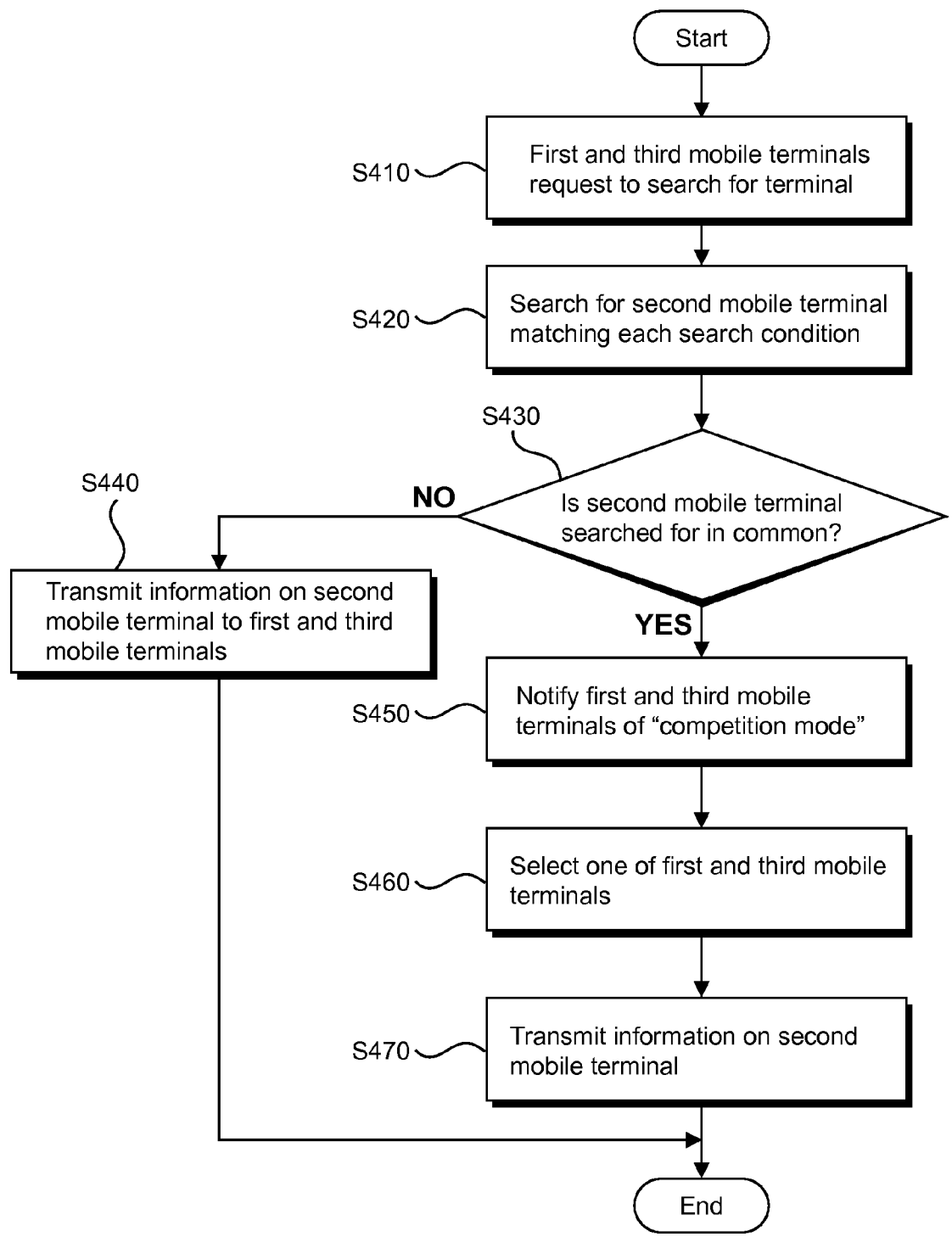
FIG. 4 is a flowchart illustrating a method for providing a mobile terminal search service according to another exemplary embodiment of the present invention.

A method for providing a mobile terminal search service according to another exemplary embodiment of the present invention will be described with reference to FIG. 4. FIG. 4 is a flowchart illustrating a method for providing a mobile terminal search service according to another exemplary embodiment of the present invention.

In the present exemplary embodiment, it is assumed that two or more mobile terminals make a request for mobile terminal search, and one mobile terminal is searched for in common.

First, the first and third mobile terminals request to search for a mobile terminal (S410). For example, the first and third mobile terminals may transmit avatar information and search conditions, such as ideal type information, and request to search for a mobile terminal.

In response to the search requests from the first and third mobile terminals, the second mobile terminal may be searched for in common (S430). For example, when a plurality of mobile terminals request to search for the second mobile terminal matching substantially the same ideal type information at substantially the same time, the second mobile terminal may be searched for in common. If the ideal type information differs so that different mobile terminals are searched for, information on the searched-for mobile terminals is transmitted to the first and third mobile terminals (S440). For example, the avatar information of the searched-for mobile terminal may be transmitted to the first and third mobile terminals.

Meanwhile, when the second mobile terminal is searched for in common, the first and third mobile terminals are notified of a first competition mode (S450). The first competition mode may correspond to a case where at least one mobile terminal is searched for in common in response to search requests made by two or more mobile terminals. In this case, an indication as to whether the search is successful in response to the search requests from the first and third mobile terminals, and information on the first and third mobile terminals, may be transmitted to the second mobile terminal.

In the first competition mode, one of the first and third mobile terminals is selected (S460). For example, the second mobile terminal may select one of the first and third mobile terminals based on their avatar information. Alternatively, the mobile terminal having an avatar at a relatively higher level may be selected irrespective of the second mobile terminal.

Alternatively, one of the first and third mobile terminals may be selected in competition through a game. In this case, the first and third mobile terminals may compete through the game by accessing the web server. In the first competition mode, information on the selected mobile terminal may be transmitted to the second mobile terminal.

Information on the second mobile terminal is then transmitted to the selected mobile if terminal (S470). For example, the avatar information of the second mobile terminal is transmitted to the selected mobile terminal. In this case, the avatar figure, avatar level, state index, and the like of the second mobile terminal may be displayed on the selected mobile terminal. Alternatively, the location information of the second mobile terminal may be transmitted to the selected mobile terminal.

Meanwhile, two or more mobile terminals may be searched for in common in step (S420), in which the second mobile terminal is searched for, in contrast to the above-described embodiment. In this case, the two or more searched mobile terminals are notified of a second competition mode. The second competition mode may correspond to a case where two or more mobile terminals are searched for. In this case, the first and third mobile terminals may be notified of the second competition mode. In the second competition mode, the second mobile terminal may be selected, as in the first competition mode. For example, the second mobile terminal having an avatar at a relatively higher level may be selected. Alternatively, the second mobile terminal may be selected in competition through a game.

Another example for implementing competition employs a first competition mode (competition mode 1) and a second competition mode (competition mode 2). In competition mode 1 an avatar is selected automatically according to the order of the avatar's level and status meters and starting the selection with the highest level. Where there are multiple avatars having the same selection levels in competition mode 1, competition mode 2 then becomes available. Alternatively, even in competition mode 1, it is possible to select avatars manually, if users prefer, through online multi game play among avatars.

Referring again to FIG. 3, each of the mobile terminals 301 and 302 may have an avatar created or set by a user, as shown in FIG. 2a. For example, the mobile terminals 301 may access the web server to download an avatar figure and an avatar growing program. The user may use the avatar growing program to grow the avatar. The avatar has avatar information including a figure, a unique name, a level, and a state index. The user may grow the avatar by adjusting the figure of the avatar, the unique name, the level, and the state index using the mobile terminal. The user of the mobile terminals 301 and 302 may grow the avatar to resemble himself/herself or however he/she desires.

The state index and the avatar level operate as described above with reference to FIG. 2b. A mobile terminal search condition may be determined depending on the avatar information. For example, a geographical range for mobile terminal search may be determined depending on the avatar level. That is, when the avatar level is high, a mobile terminal may be searched for within a broader region, and when the avatar level is low, a mobile terminal may be searched for within a relatively narrower region.

Meanwhile, the user may set and store user profile information and ideal type information in the mobile terminal. Here, the user profile information may include sex, age, height, style, and job. The ideal type information may include sex, hobby, style, age, and job, as shown in FIG. 2d. The number of items constituting the ideal type information may be determined depending on the avatar level. For example, when the avatar level is "1", three pieces of ideal type information—sex, hobby, and age—may be set, and when the avatar level is "2", five pieces of ideal type information—sex, hobby, age, style, and job—may be set. The user profile information and the ideal type information are sent to the database and updated and stored in the database, and also are sent to the search server and used in a process of searching for an ideal match through the mobile terminal search service described herein.

Figure 5:
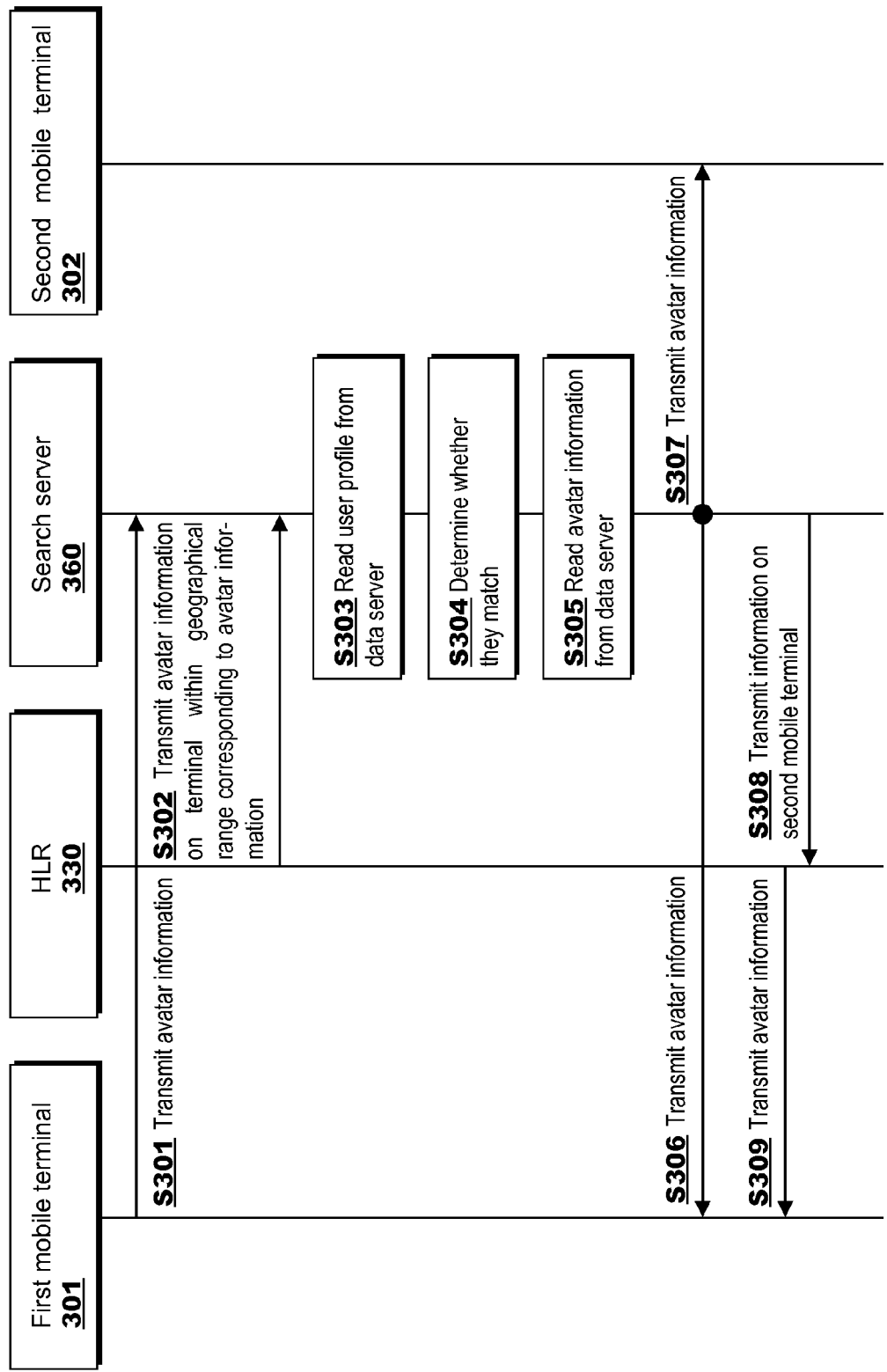
FIG. 5 is a flowchart illustrating a method for providing a mobile terminal search service according to an exemplary embodiment of the present invention.

The method for providing a mobile terminal search service according to an embodiment of the present invention will now be described in detail with reference to FIG. 5. FIG. 5 is a flowchart illustrating a method for providing a mobile terminal search service according to an exemplary embodiment of the present invention. Here, it is assumed that the first mobile terminal 301 requests to search for the second mobile terminal 302 matching ideal type information of the mobile terminal user.

First, the first mobile terminal 301 transmits the avatar information and ideal type information of the first mobile terminal 301 and requests to search for the second mobile terminal 302 matching the ideal type information of the first mobile terminal 301 (S301). In this case, an image of the figure of the avatar for the first mobile terminal gradually disappearing may be displayed on a display panel of the first mobile terminal. For example, when the user of the first mobile terminal 301 instructs his or her avatar to search for an ideal match (a search request), the image of the avatar gradually disappearing as he or she leaves the first mobile terminal 301 to search as instructed may be displayed on the display panel of the first mobile terminal. Here, the avatar may gradually disappear in a number of different ways, such as by fading out until no longer seen or by exiting one side of the display panel. Thus, the user of the mobile terminal 301 can feel like the avatar is his or her agent. For example, the user of the mobile terminal 301 may feel like the avatar is a waiter at a party.

Meanwhile, the first mobile terminal 301 may select some specific regions or buildings in the geographical range corresponding to the avatar information, and request to search for the second mobile terminal 302 within the specific region or buildings. In this case, the first mobile terminal 301 may further transmit information on the selected specific regions or buildings.

The HLR 330 transmits information on a mobile terminal located in the geographical range corresponding to the avatar information of the first mobile terminal, to the search server 360. For example, when the level in the avatar information of the first mobile terminal is "1", the HLR 330 first searches for a mobile terminal located in a first range A1 of FIG. 2c and transmits information on the first searched-for mobile terminal to the search server 360 (S302). When the level is "2", the HLR 330 may search for a mobile terminal located in a second range A2 of FIG. 4a. Here, the HLR 330 may transmit MINs of mobile terminals located in the respective ranges A1 and A2 to the search server 360.

The search server 360 may read the user profile information of the mobile terminal user from the database 362 using the MIN of the mobile terminal received from the HLR 330 (S303). The search server 360 compares the read user profile information with the ideal type information received from the first mobile terminal 301 to further search for a matching mobile terminal (S304). If the searched-for mobile terminal is the second mobile terminal 302, the search server 360 reads the avatar information of the second mobile terminal 302 from the database 362 (S305) and transmits it to the first mobile terminal 301 (S306). In this case, the avatar figure, avatar level, state index, and the like of the second mobile terminal 302 may be displayed on the first mobile terminal 301. Specifically, an image of the avatar of the first mobile terminal 301 escorting the avatar of the second mobile terminal may be displayed.

In this case, the search server 360 may also transmit an indication that the second mobile terminal 302 has been searched for in response to the search request from the first mobile terminal 301, and may transmit the avatar information of the first mobile terminal 301 to the second mobile terminal 302 (S307). In this case, the avatar figure, avatar level, state index, and the like of the first mobile terminal 301 may be displayed on the second mobile terminal 302.

When the search server 360 transmits the MIN of the second mobile terminal 302 to the HLR 330 (S308), the HLR 330 may transmit the location information of the second mobile terminal 302 to the first mobile terminal 301 (S309).

Since the avatar information, the user profile information, and the ideal type information are variable, they may be updated and stored in the database 362 upon at least one of a call request, communication, a message transmission request, a data update request, and a search service request. Here, the data update request refers to a separate request made by the mobile terminal user to update user profile information, ideal type information, avatar information, and the like. For this, the mobile terminals 301 and 302 may have a separate key for data update request.

Figure 6:
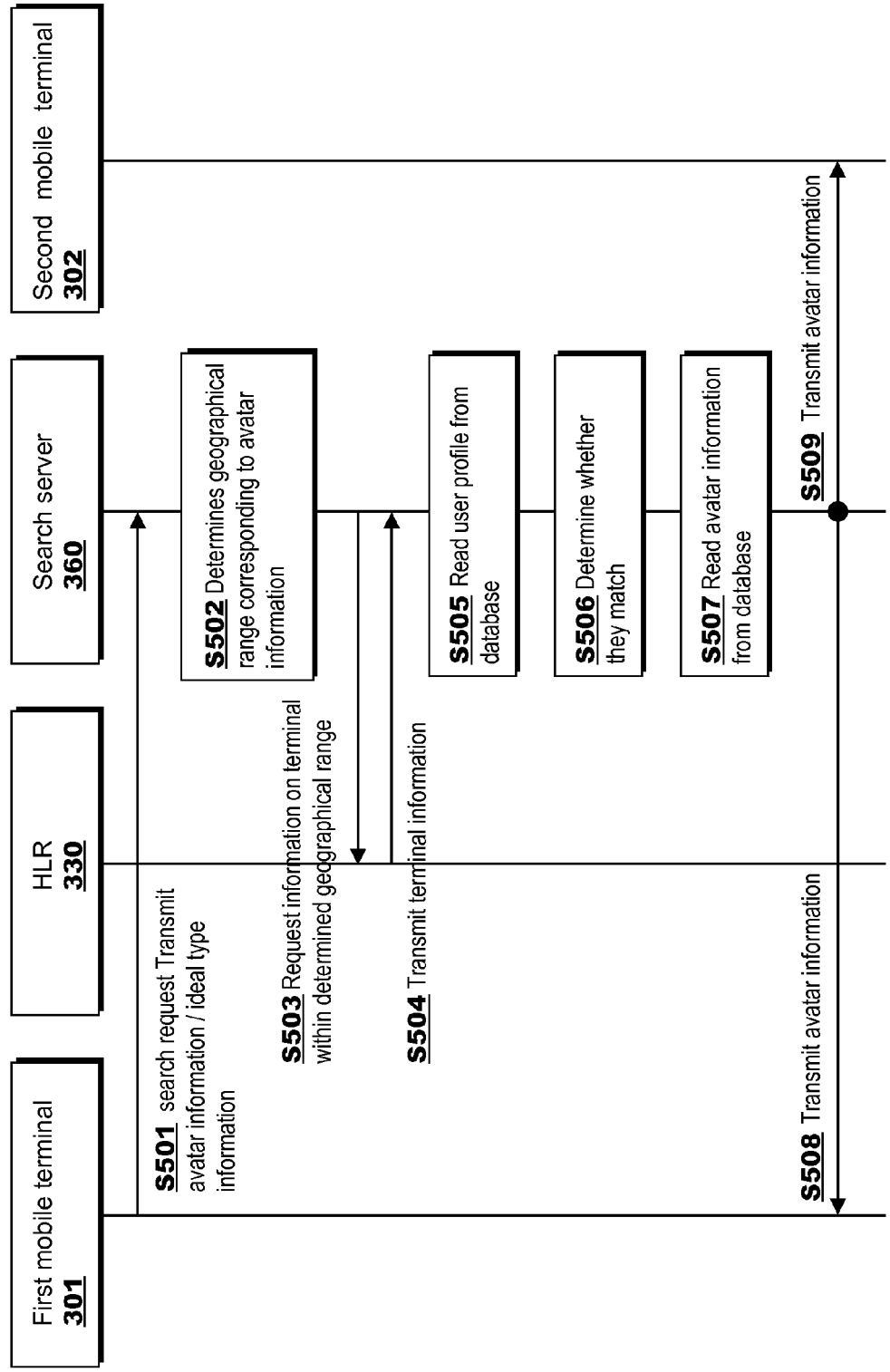
FIG. 6 is a flowchart illustrating a method for providing a mobile terminal search service according to another exemplary embodiment of the present invention.

A method for providing a mobile terminal search service according to another exemplary embodiment of the present invention will now be described with reference to FIG. 6. FIG. 6 is a flowchart illustrating the method for providing a mobile terminal search service according to another exemplary embodiment of the present invention.

Referring to 6, in the method for providing a mobile terminal search service according to another exemplary embodiment of the present invention, when the first mobile terminal 301 makes a request for mobile terminal search (S501), the search server 360 receives the avatar information and ideal type information of the first mobile terminal 301 and determines a geographical range corresponding to the avatar information (S502). When the search server 360 requests the HLR 330 to provide information on a mobile terminal located in the determined geographical range (S503), the HLR 330 transmits the requested information on the mobile terminal to the search server 360 (S504). The search server 360 reads the user profile information from the data server using the mobile terminal information received from the HLR 330 (S505) and determines whether it matches the ideal type information (S506). When the user profile information matches the ideal type information, the search server 360 may read the avatar information of the second mobile terminal 302 having the user profile information from the database (S507) and transmit the avatar information to the first mobile terminal 301 (S508). The search server 360 may also transmit the avatar information of the first mobile terminal 301 to the second mobile terminal 302 (S509).

Meanwhile, in the method for providing a mobile terminal search service according to the present invention, the search server 360 may obtain the location information of the mobile terminal using a Global Positioning System (GPS), in contrast to the above-described exemplary embodiments. That is, when each mobile terminal includes a GPS module and transmits coordinate information, the search server 360 may recognize location information of each mobile terminal, based on the coordinate information and search for a mobile terminal matching the ideal type information among mobile terminals located in the geographical range corresponding to the avatar information.

Alternatively, the avatar of the first mobile terminal 301 may access another mobile terminal to search for the second mobile terminal 302 matching the ideal type information. Specifically, the first mobile terminal 301 may include a web agent and may access the second mobile terminal 302 through the mobile network, retrieve the avatar information, user profile information, and the like of the second mobile terminal 302, and transmit the search results to the first mobile terminal 301.

Figure 8A:
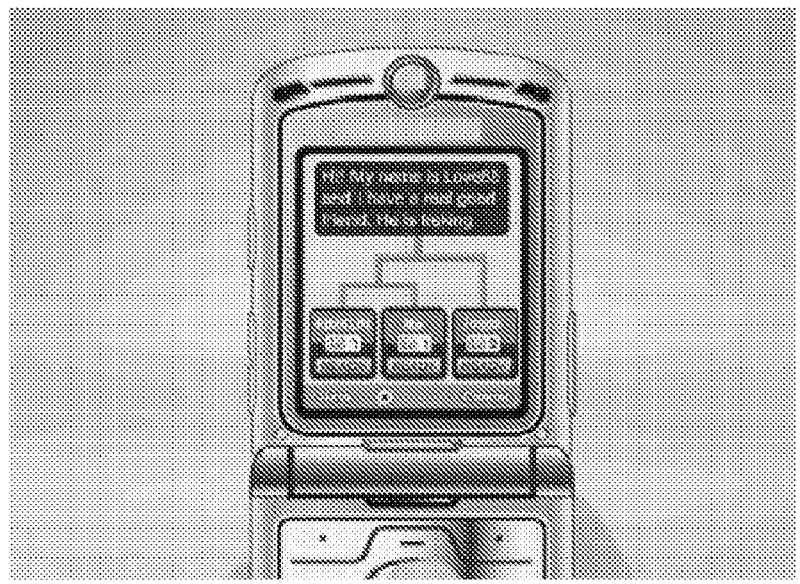
FIGS. 8a to 8b illustrate an image of a mobile terminal search service displayed on a mobile terminal.
Figure 8B:
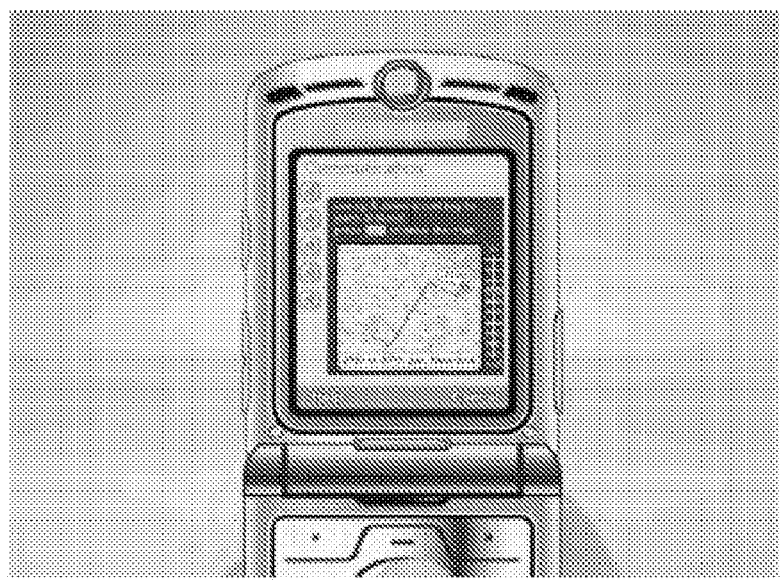

FIG. 7 is a flowchart illustrating a method for providing a mobile terminal search service according to an exemplary embodiment of the present invention, and FIGS. 8a and 8b illustrate an image of a mobile terminal search service displayed on a mobile terminal.

Referring to FIG. 7, a plurality of mobile terminals transmits search conditions and requests a mobile terminal search (S710). Here, each of the search requesting mobile terminals may have an avatar created or set by a user, as shown in FIG. 2a as described above. After the plurality of search requesting mobile terminals transmit search conditions and make a search request, an image of the figure of each avatar gradually disappearing, as described above, may be displayed on a display panel of each search requesting mobile terminal.

Meanwhile, the search condition of the mobile terminal may be determined depending on the avatar information. Specifically, when the search condition includes ideal type information and the search requesting mobile terminal transmits the ideal type information and requests to search for a mobile terminal that matches the ideal type information, the number of items constituting the ideal type information may be determined by the avatar level as described above with reference to FIG. 2d.

Moreover, a geographical range for mobile terminal search may be determined depending on the avatar level. That is, when the avatar level is high, a mobile terminal may be searched for within a broader region, and when the avatar level is low, a mobile terminal may be searched for within a relatively narrower region.

Meanwhile, the user may set and store user profile information and ideal type information in the mobile terminal. Here, the user profile information includes sex, age, height, style, and job and is used when searching for a mobile terminal matching the ideal type information. The search requesting mobile terminal may transmit search conditions including the ideal type information, avatar information and/or user profile information upon a search request.

A mobile terminal matching each search condition is then searched for (S720). For example, when the plurality of search requesting mobile terminals transmit respective ideal type information, a mobile terminal having user profile information matching the ideal type information may be searched for. When the plurality of search requesting mobile terminals transmit respective avatar information, a mobile terminal matching the ideal type information among mobile terminals located within a geographical range determined depending on the respective avatar information may be searched for.

At this time, the mobile terminal may be searched for in common in response to the requests from the plurality of search requesting mobile terminals (S730). For example, when the plurality of search requesting mobile terminals request to search for a mobile terminal matching substantially the same ideal type information at substantially the same time, a common search may be conducted for the mobile terminal. If the ideal type information differs so that different mobile terminals are searched for, information on the searched-for mobile terminals is transmitted to each search requesting mobile terminal (S740). For example, the avatar information of each searched-for mobile terminal may be transmitted to each search requesting mobile terminal.

Meanwhile, when a mobile terminal is searched for in common, the respective search requesting mobile terminals are notified of a first competition mode (S750). The first competition mode may correspond to a case where at least one mobile terminal is searched for in common in response to search requests made by two or more mobile terminals. For example, avatar information of the other search requesting mobile terminals and a list of tournament matches may be displayed on each search requesting mobile terminal, as shown in FIG. 8a. In this case, an indication as to whether the search is successful in response to the search requests from the plurality of search requesting mobile terminals, and information on the search requesting mobile terminals, may be transmitted to the searched-for mobile terminal.

In the first competition mode, one of the plurality of search requesting mobile terminals is selected (S760). For example, the searched-for mobile terminal may select one of the plurality of search requesting mobile terminals based on their avatar information. Alternatively, a search requesting mobile terminal having an avatar at a relatively higher level may be selected irrespective of the searched-for mobile terminal. Alternatively, two or more search requesting mobile terminals may be selected in competition through a game. In this case, the two or more mobile terminals may compete through the game by accessing the web server. Information on the search requesting mobile terminal selected in the first competition mode may be transmitted to the searched-for mobile terminal.

The information on the searched-for mobile terminal is then transmitted to the selected search requesting mobile terminal (S770). For example, the avatar information of the searched-for mobile terminal is transmitted to the selected search requesting mobile terminal. In this case, the avatar figure, avatar level, state index, and the like of the searched-for mobile terminal may be displayed on the selected search requesting mobile terminal. Alternatively, the location information of the searched-for mobile terminal may be transmitted to the selected search requesting mobile terminal. For example, the location information of the searched-for mobile terminal may be displayed on a map, as in FIG. 8b.

Meanwhile, two or more mobile terminals may be searched for in common, in contrast to the above-described embodiment. In this case, the two or more searched-for mobile terminals are notified of a second competition mode. The second competition mode may correspond to a case where two or more mobile terminals are searched for. In this case, the plurality of search requesting mobile terminals may be notified of the second competition mode. In the second competition mode, one searched-for mobile terminal may be selected, as in the first competition mode. For example, a searched-for mobile terminal having an avatar at a relatively higher level may be selected. Alternatively, two or more searched-for mobile terminals may be selected in competition through a game. In this case, information of the searched-for mobile terminal selected in the second competition mode, such as avatar information or location information, may be transmitted to the search requesting mobile terminal selected in the first competition mode.

Figure 9:
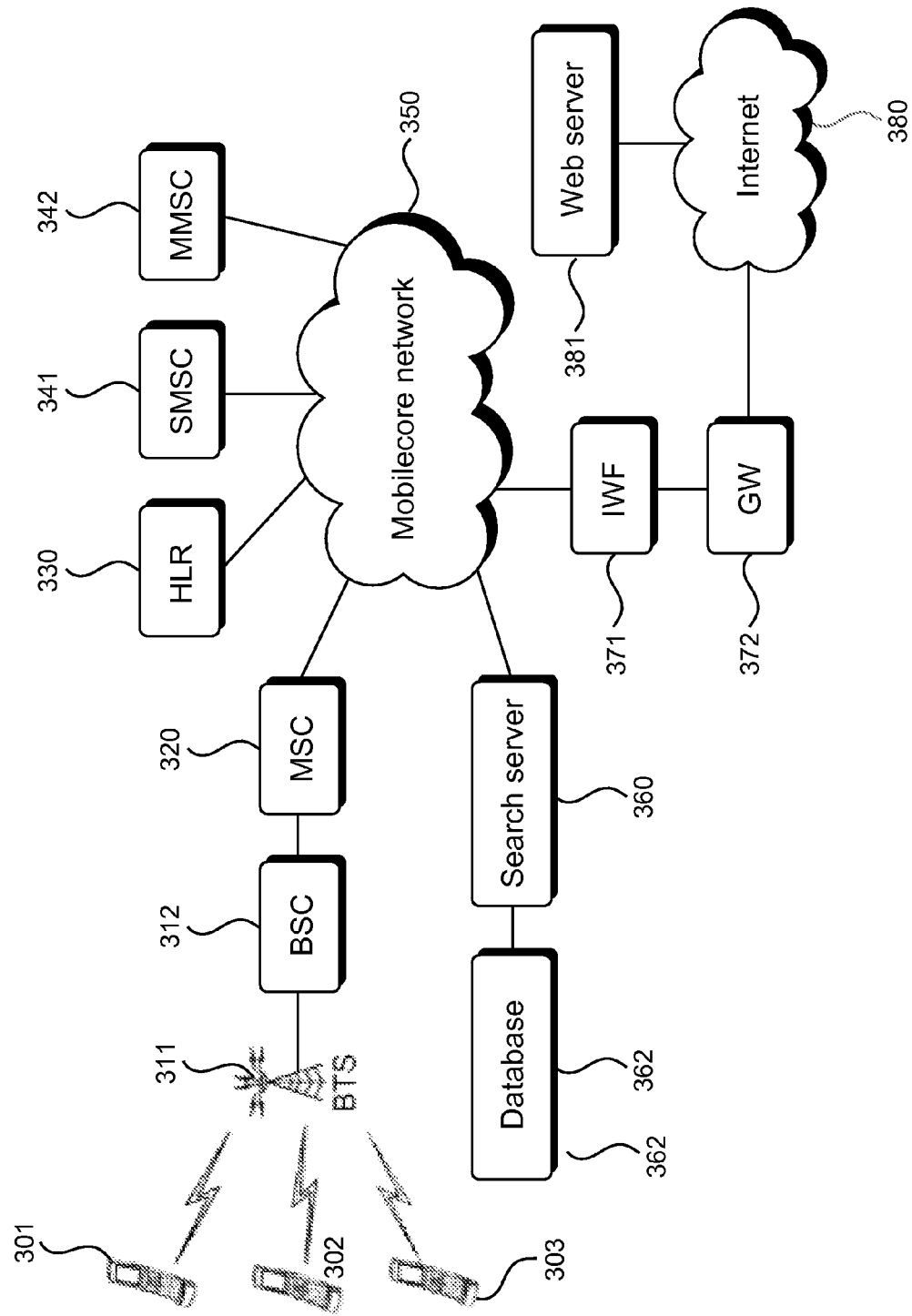
FIG. 9 is a block diagram of a system for providing a mobile terminal search service according to an embodiment of the present invention.

A system for providing the above-described a mobile terminal search service will now be described with reference to FIG. 9. FIG. 9 is a block diagram illustrating the system for providing a mobile terminal search service according to an embodiment of the present invention. The method for providing a mobile terminal search service according to the present invention may be performed by a variety of systems, including the system shown in FIG. 9.

Referring to FIG. 9, a mobile terminal search service system according to an exemplary embodiment of the present invention includes search requesting mobile terminals 301 and 302, a searched-for mobile terminal 303, a base station transceiver subsystem (BTS) 311, a base station controller (BSC) 312, a mobile switching center (MSC) 320, a home location register (HLR) 330, a short message service center (SMSC) 341, a multimedia message service center (MMSC) 342, a search server, a database, a mobile core network 350, an inter-working function (IWF) 371, a WAP gateway 372, the Internet 380, and a web server 381.

The search requesting mobile terminals 301 and 302 and the searched-for mobile terminal 303 may perform voice and data communication with other mobile terminals connected to the mobile network, and may access the wireless Internet via the IWF 371 and GW 372 which interwork with the mobile network. The search requesting mobile terminals 301 and 302 and the searched-for mobile terminal 303 may include a wireless Internet platform for driving applications related to the wireless Internet or a browser for accessing the wireless Internet. As described above, the wireless Internet platform may include a Wireless Internet Platform for Interoperability (WIPI), BREW (Binary Runtime Environment for Wireless) or Android (a new mobile platform). The browser for accessing wireless Internet may include an HTML-based Microsoft Internet Explorer (MIE) using HTTP protocol, and a Handheld Device Transport Protocol (HDTP), as well as a Wireless Application Protocol (WAP)-based WAP browser.

Each of the search requesting mobile terminals 301 and 302 transmits search conditions and makes a request for mobile terminal search. As described above, the respective search requesting mobile terminals 301 and 302 may have avatar information. The search condition may be determined depending on the avatar information. Here, the search requesting mobile terminals 301 and 302 and the searched-for mobile terminal 303 according to an exemplary embodiment of the present invention may be any of various wireless communication mobile terminals, such as Personal Digital Assistants (PDAs), cellular phones, Personal Communication Service (PCS) phones, hand-held personal computers (PCs), Global System for Mobile (GSM) phones, Wideband CDMA (WCDMA) phones, Code Division Multiple Access (CDMA) 2000 phones, Mobile Broadband System (MBS) phones, etc.

The BTS 311 is wirelessly connected with the search requesting mobile terminals 301 and 302 and the searched-for mobile terminal 303 within a wireless coverage area, manages the search requesting mobile terminals 301 and 302 and the searched-for mobile terminal 303, establishes a communication channel, and performs voice and data communication. The BTS 311 is arranged on a cell-by-cell basis for each wireless coverage area and receives location information from the search requesting mobile terminals 301 and 302 and the searched-for mobile terminal 303 within a cell managed by the BTS 311. Location information including location, state, and identifier information of the search requesting mobile terminals 301 and 302 and the searched-for mobile terminal 303 is transmitted to the MSC 320 via the BTS 311 and the BSC 312 and registered in the MSC 320. In the present exemplary embodiment, the BTS 311 transmits the search condition and the avatar information of the search requesting mobile terminals 301 and 302 to the BSC 312. In the example of FIG. 9, the search requesting mobile terminals 301 and 302 and the searched-for mobile terminal 303 are located in the same cell. When the search requesting mobile terminals 301 and 302 and the searched-for mobile terminal 303 are located in different cells, different BTSs may manage the search requesting mobile terminals 301 and 302 and the searched-for mobile terminal 303.

The BSC 312 connects the BTS 311 to the MSC 320 while managing the BTS 311, and performs signal processing for communication between the BTS 311 and the MSC 320, channel allocation and release for the mobile terminals 301 and 302, a determination as to whether hand-off between BTS cells is performed, BTS operation and maintenance, and the like. In the present exemplary embodiment, the BSC transmits the search condition and the avatar information to the MSC 320.

The MSC 320 exchanges a telephone connection between the search requesting mobile terminals 301 and 302 and the searched-for mobile terminal 303. The MSC 320 also performs communication establishment and release for the search requesting mobile terminals 301 and 302 and the searched-for mobile terminal 303, location registration and hand-off processing, and interworking with other networks. The MSC 320 includes a visitor location register (VLR, not shown) and interworks with the HLR 330, the SMSC 341, and the MMSC 342 to process calls from the mobile terminals 301 and 302. The MSC 320 receives location information of the search requesting mobile terminals 301 and 302 and the searched-for mobile terminal 303 via the BTS 311, temporarily stores the location information in the VLR of the MSC 320, requests the HLR 330 to register the location information, acquires, from the HLR 330, information on subscribers of the search requesting mobile terminals 301 and 302 and the searched-for mobile terminal 303 located within its coverage area, and stores the information temporarily. In the present exemplary embodiment, the MSC 320 may transmit avatar information of the search requesting mobile terminals 301 and 302 to the HLR 330 and request to search for a mobile terminal located within a geographical range corresponding to the avatar information. The MSC 320 may also transmit ideal type information of the search requesting mobile terminals 301 and 302 to the search server 360.

The HLR 330 interworks with the MSC 320, the SMSC 341, and the MMSC 342, stores information relating to mobile subscribers, such as subscriber information, location information, and the like of the search requesting mobile terminals 301 and 302 and the searched-for mobile terminal 303, and performs call processing and various processing related to additional services in communication with the VLR. Here, the subscriber information includes a Mobile Identification Number (MIN), an Electronic Serial Number (ESN), information on mobile service subscribed to by the subscribers, and the like. In the present exemplary embodiment, the HLR 330 transmits information on a mobile terminal located in the geographical range corresponding to the avatar information of the search requesting mobile terminals 301 and 302, such as the MIN, to the search server 360.

The SMSC 341 and the MMSC 342 are connected to the MSC 320 and the HLR 330 for storing, transmitting and receiving a short message and a multimedia message.

The web server 381 is included in a mobile service provider. The subscriber may download a figure of an avatar, a game program, and the like from the web server 381 and purchase an item necessary for avatar growth.

The search server 360 interworks with the database 362. The search server 360 searches for the searched-for mobile terminal 303 in response to the search requests from the search requesting mobile terminals 301 and 302. The avatar information, the user profile information, and the like of the search requesting mobile terminals 301 and 302 and the searched-for mobile terminal 303 are stored in the database 302.

When the searched-for mobile terminal 303 is searched for in common in response to the requests from the search requesting mobile terminals 301 and 302, the search server 360 notifies the search requesting mobile terminals 301 and 302 of a first competition mode. The search server 360 may also transmit avatar information of the second search requesting mobile terminal 302 to the first search requesting mobile terminal 301 and transmit avatar information of the first search requesting mobile terminal 301 to the second search requesting mobile terminal 302.

In the first competition mode, the search server 360 may select one of the search requesting mobile terminals 301 and 302 based on the respective avatar information received from the search requesting mobile terminals 301 and 302. For example, the search server 360 may select the search requesting mobile terminal 301 or 302 having an avatar at a relatively higher level. Alternatively, the search requesting mobile terminals 301 and 302 may be selected in competition through a game. In this case, they may compete by accessing the web server.

The search server 360 transmits the avatar information and/or location information of the searched-for mobile terminal 303 to the selected search requesting mobile terminal 301 or 302. In this case, the search server 360 may transmit the avatar information and/or location information the selected search requesting mobile terminal 301 or 302 to the searched-for mobile terminal 303. The search server 360 may also read user profile information of the searched-for mobile terminal 303 from the database 362 and transmit the same to the search requesting mobile terminal 301 or 302, and may read user profile information of the selected search requesting mobile terminal 301 or 302 from the database and transmit the same to the searched-for mobile terminal 303. Since the avatar information, the user profile information, and the ideal type information are variable, they may be updated and stored in the database 362 upon at least one of a call request, communication, a message transmission request, a data update request, and a search service request. Here, the data update request refers to a separate request made by the mobile terminal user to update user profile information, ideal type information, avatar information, and the like. For this, the mobile terminals 301, 302 and 303 may have a separate key for data update request.

Meanwhile, in the method for providing a mobile terminal search service according to the present invention, the search server 360 may obtain the location information of the search requesting mobile terminals 301 and 302 and the searched-for mobile terminal 303 using a Global Positioning System (GPS) or other location methods as described above for focusing a search within a geographical range. That is, when the search requesting mobile terminals 301 and 302 and the searched-for mobile terminal 303 include a GPS module and transmit coordinate information, the search server 360 may recognize location information of the search requesting mobile terminals 301 and 302 and the searched-for mobile terminal 303 based on the coordinate information and search for the mobile terminal 303 matching the ideal type information among mobile terminals located within a geographical range corresponding to the respective avatar information.

Meanwhile, the avatar of the search requesting mobile terminals 301 and 302 may access another mobile terminal to search for the mobile terminal 303 matching the ideal type information, as opposed to the above-described embodiments. Specifically, the search requesting mobile terminals 301 and 302 may include a web agent and access the searched-for mobile terminal 303 through the mobile network, retrieve the avatar information, user profile information, and the like of the searched-for mobile terminal 303, and transmit the search results to the search requesting mobile terminals 301 and 302.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for providing a mobile terminal search service, comprising the steps of:
   (a) requesting, by a first mobile terminal, to search for a second mobile terminal, the first mobile terminal having avatar information stored thereon;
   (b) searching for the second mobile terminal within a geographical range corresponding to the avatar information of the first mobile terminal;
   (c) requesting, by a third mobile terminal, to search for the second mobile terminal, the third mobile terminal having avatar information stored thereon;
   (d) searching for the second mobile terminal within a geographical range corresponding to the avatar information of the third mobile terminal; and
   (e) when the second mobile terminal is searched for in common in steps (c) and (d), notifying the first and third mobile terminals of a competition mode based upon one of the avatar information, avatar level or a game between the first and third terminals,
   wherein when the avatar information of the first terminal is a first level, the searching for the second mobile terminal occurs within a first geographical range, and wherein when the avatar information of the first terminal is a second level, the searching for the second mobile terminal occurs within a second geographical range, the first geographical range being smaller in size than the second geographical range.

2. The method of claim 1, further comprising the step of: transmitting avatar information of the second searched-for mobile terminal to the first mobile terminal.

3. The method of claim 2, further comprising the step of: transmitting an indication as to whether the search requested by the first mobile terminal is successful and the avatar information of the first mobile terminal to the second mobile terminal.

4. The method of claim 1, wherein step (a) comprises transmitting, by the first mobile terminal, ideal type information and requesting to search for the second mobile terminal matching the ideal type information.

5. The method of claim 4, wherein the number of ideal type information fields corresponds to the avatar information.

6. The method of claim 1, wherein the avatar information of the first mobile terminal is adjusted through at least one of a game performed on the first mobile terminal and an item purchased online or offline.

7. The method of claim 1, further comprising the step of:
   (f) transmitting avatar information of the second mobile terminal to a selected one of the first and third mobile terminals.

8. The method of claim 1, wherein step (a) comprises displaying an image in which a figure of the avatar of the first mobile terminal disappears, on a display panel of the first mobile terminal, after requesting to search for the second mobile terminal.

9. The method of claim 1 wherein the step of searching for the second mobile terminal further comprises the step of obtaining the location information of the second mobile terminal using Global Positioning System coordinates.

10. The method of claim 1 wherein the step of searching for the second mobile terminal further comprises the step of obtaining the location information of the second mobile terminal by measuring the strength or weakness of signals from at least three cell towers.

11. The method of claim 1 wherein the step of searching for the second mobile terminal further comprises the step of obtaining the location information of the second mobile terminal through a wireless internet hotspot.

12. A method for providing a mobile terminal search service, comprising the steps of;
   (a) transmitting avatar information and ideal type information of a first mobile terminal to request to search for a second mobile terminal matching the ideal type information;
   (b) searching for the second mobile terminal having user profile information matching the ideal type information among mobile terminals located within a geographical range corresponding to the avatar information of the first mobile terminal;
   (c) requesting, by a third mobile terminal, to search for the second mobile terminal, the third mobile terminal having avatar information stored thereon;
   (d) searching for the second mobile terminal within a geographical range corresponding to the avatar information of the third mobile terminal; and
   (e) when the second mobile terminal is searched for in common in steps (c) and (d), notifying the first and third mobile terminals of a competition mode,
   wherein when the avatar information of the first terminal is a first level, the searching for the second mobile terminal occurs within a first geographical range, and wherein when the avatar information of the first terminal is a second level, the searching for the second mobile terminal occurs within a second geographical range, the first geographical range being smaller in size than the second geographical range.

13. The method of claim 12, further comprising the step of: reading avatar information of the second mobile terminal from a database and transmitting the avatar information to the first mobile terminal.

14. The method of claim 13, wherein the avatar information and the user profile information are updated and stored in the database upon at least one of a call request, communication, a message transmission request, a data update request, and step (a).

15. The method of claim 13, further comprising the step of: transmitting an indication as to whether the second mobile terminal has been searched for and the avatar information of the first mobile terminal to the second mobile terminal.

16. The method of claim 12, further comprising the step of: transmitting location information of the second searched-for mobile terminal to the first mobile terminal.

17. The method of claim 12, wherein the number of items constituting the ideal type information is determined depending on the avatar information of the first mobile terminal.

18. The method of claim 17, wherein the avatar information of the first mobile terminal is adjusted through at least one of a game performed on the first mobile terminal and an item purchased online or offline.

19. The method of claim 12, wherein step (b) comprises the steps of:
- (b1) first searching for a mobile terminal located within the geographical range corresponding to the avatar information; and
- (b2) reading user profile information of a user of the first searched-for mobile terminal from a database and further searching for the second mobile terminal matching the ideal type information.

20. The method of claim 12, wherein when a user of the first mobile terminal selects some regions or buildings within the geographical range corresponding to the avatar information,
- step (a) comprises transmitting information on the selected regions or buildings, and
- step (b) comprises searching for the second mobile terminal located within the selected regions or buildings.

21. The method of claim 12, wherein step (a) comprises displaying an image of an avatar figure of the first mobile terminal disappearing on a display panel of the first mobile terminal, after requesting to search for the second mobile terminal.

22. A mobile terminal search service system comprising:
- a first mobile terminal for transmitting avatar information and ideal type information and making a request for a search for a second mobile terminal;
- a location register storing location information;
- a search server for receiving information on a mobile terminal located within a geographical range corresponding to the avatar information from the location register, and determining whether user profile information of another mobile terminal matches the ideal type information;
- a third mobile terminal making a request for a search for the second mobile terminal, the third mobile terminal having avatar information stored thereon, and searching for the second mobile terminal within a geographical range corresponding to the avatar information of the third mobile terminal, and when the second mobile terminal is searched for, notifying the first and third mobile terminals of a competition mode based upon one of avatar information, avatar level, or a game between the first and third terminals,
- wherein when the avatar information of the first terminal is a first level, the searching for the second mobile terminal occurs within a first geographical range, and wherein when the avatar information of the first terminal is a second level, the searching for the second mobile terminal occurs within a second geographical range, the first geographical range being smaller in size than the second geographical range.

23. The system of claim 22, wherein the search server transmits avatar information of the second mobile terminal having the user profile information matching the ideal type information to the first mobile terminal.

24. The system of claim 23, further comprising a database for storing the avatar information and the user profile information of the first mobile terminal and of the second mobile terminal.

25. The system of claim 24, wherein each mobile terminal transmits the avatar information and the user profile information upon at least one of a call request, communication, a message transmission request, and a mobile terminal search request, and
the search server updates and stores the transmitted avatar information and user profile information in the database.

26. The system of claim 23, wherein the search server further transmits location information of the second mobile terminal to the first mobile terminal.

27. The system of claim 22, wherein the number of items constituting the ideal type information is determined depending on the avatar information.

28. The system of claim 27, wherein the avatar information of the first mobile terminal is adjusted through at least one of a game performed on the first mobile terminal and an item purchased online or offline.

29. The system of claim 22, wherein when a user of the first mobile terminal selects some regions or buildings within the geographical range corresponding to the avatar information,
the first mobile terminal further transmits information on the selected regions or buildings, and
the search server searches for the second mobile terminal located within the selected regions or buildings.

* * * * *